United States Patent [19]

Sawaki et al.

[11] Patent Number: 4,814,028
[45] Date of Patent: Mar. 21, 1989

[54] METHOD OF FORMING FILLED PROTECTIVE SHEATH ON COUPLED WIRE CONDUCTORS

[75] Inventors: Atsushi Sawaki; Mamoru Ono; Toshio Okazaki; Kohji Naruse, all of Toyota, Japan

[73] Assignee: Yazaki Corporation, Japan

[21] Appl. No.: 119,480

[22] Filed: Nov. 12, 1987

[30] Foreign Application Priority Data

Nov. 12, 1986 [JP] Japan ................... 61-267667

[51] Int. Cl.⁴ ............................ H01B 13/08
[52] U.S. Cl. ........................ 156/48; 156/49; 156/56; 156/73.2; 156/275.5; 264/22; 264/272.14
[58] Field of Search .................. 156/49, 86, 73.2, 158, 156/275.5, 275.7, 48, 53, 56; 264/22, 272.14

[56] References Cited

U.S. PATENT DOCUMENTS

| | | |
|---|---|---|
| 3,550,765 | 12/1970 | Anderson . |
| 3,597,528 | 8/1971 | Penfield et al. . |
| 3,607,507 | 9/1971 | Enos ................... 156/158 |
| 4,220,619 | 9/1980 | Kersten ............... 156/49 X |
| 4,406,719 | 9/1983 | Mitsumoto et al. ...... 156/86 X |
| 4,664,732 | 5/1987 | Campbell et al. ....... 156/158 |

FOREIGN PATENT DOCUMENTS

| | | |
|---|---|---|
| 1310809 | 3/1973 | United Kingdom . |
| 1479653 | 7/1977 | United Kingdom . |
| 1535986 | 12/1978 | United Kingdom . |

Primary Examiner—Robert A. Dawson
Attorney, Agent, or Firm—Wigman & Cohen

[57] ABSTRACT

To reliably sheath two coupled conductors of two wires, a tube made of a light transmittable material is fitted to the two coupled conductors and adjoining wire insulating covers; a photohardening resin is put into a gap formed between the tube and the wires; and the photohardening resin is irradiated from outside the tube with an ultraviolet ray into hard polymer. The sheath thus formed is resistant against moisture and strong in mechanical strength.

2 Claims, 2 Drawing Sheets

FIG.1(A)  FIG.1(B)  FIG.1(C)
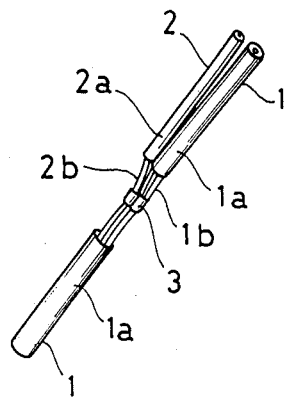
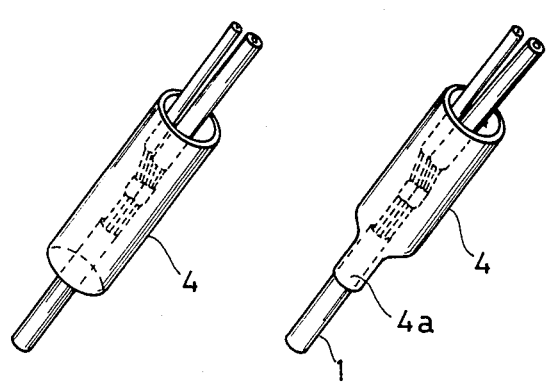
FIG.1(D)  FIG.1(E)
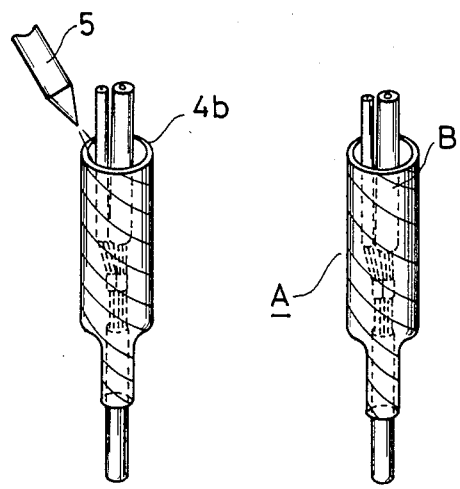

METHOD OF FORMING FILLED PROTECTIVE SHEATH ON COUPLED WIRE CONDUCTORS

BACKGROUND OF THE INVENTION

1. Field of the Invention

The present invention relates to a method of forming a protective sheath on coupled wire conductors, and more specifically to a method of protecting and fixing a position at which two different wire conductors are connected to each other for configuring various wiring systems.

2. Description of the Prior Art

Conventionally, when two wires covered by an insulating cover material such as vinyl resin are fixedly coupled to each other, each insulating cover material is first removed from a predetermined coupling position of each wire to expose each conductor; the two exposed conductors are twisted together or arranged in parallel to each other; a conductive sleeve is fitted or pressure fitted thereto or the two conductors are soldered to connect the two wire conductors; and finally, the conductor exposure portion is protected by winding an insulating tape therearound.

In this prior-art taping method, however, there exist various drawbacks in that the insulation of the coupled conductors is not perfect; the shape of the coupled conductors is not uniform; and further the strength is not sufficiently reliable.

To overcome these problems involved in the taping method, a method of forming an insulating sheath on the coupled conductors by resin molding method has been proposed instead of the insulating tape winding. In this method, the conductor coupled portion and the adjacent insulating cover material are set to a molding die, and a resin such as vinyl chloride resin is injected into the molding die to seal the conductor coupled portion and simultaneously form a new insulating resin sheath in tight contact with the insulating cover material.

In this molding method, however, even if the wire insulating cover material and the newly formed insulating sheath are made of the same material as vinyl chloride, since these two are not perfectly melted and welded to each other due to the presence of temperature difference within the molding die, the boundary of these two materials is not perfectly fixed and therefore it is difficult to prevent moisture from reaching the boundary between the two.

To improve the above-mentioned molding method, a bonding agent is applied on the surface of the wire insulating cover material, before being set to the molding die, to increase the adhesive strength between the two. In this prior-art wire coupling method, however, since the procedure is complicated as follows: two wire conductors are exposed and coupled to each other; a bonding agent is applied to the exposed conductor coupled portion; and the two coupled wires are set to the molding die, there exist problems in that the number of steps is large; the workability is not excellent; the adhesive strength is not yet sufficient; and the resin insulating sheath is apt to be formed into an eccentric condition.

SUMMARY OF THE INVENTION

With these problems in mind, therefore, it is the primary object of the present invention to provide a method of forming a strong protective sheath on coupled wire conductors by simple procedure without producing any defective coupled wires.

To achieve the above-mentioned object, a method of forming a protective sheath on coupled wire conductors of at least two wires each having a conductor and an insulating cover, according to the present invention, comprises the following steps of: (a) removing the insulating cover from each wire to expose each wire conductor to be coupled; (b) coupling at least two exposed conductors to each other; (c) fitting a tube made of a light transmittable material to the two coupled wire so as to cover the coupled wire conductors and adjoining insulating covers of the two wires; (d) closing one end of the light transmittable tube into contact with at least one insulating cover; (e) putting a photohardening resin into a gap formed between the tube and the wires; and (f) irradiating the photohardening resin from outside the tube with light into hard polymer.

The photohardening resin includes a monomer and a polymerization initiator of ultra-violet ray sensitive type. The monomer is vinyl group monomer or acryl group monomer.

The light transmissible tube is a vinyl chloride based resin or a polyolefine based resin. The light for irradiating the photohardening resin is ultraviolet rays. Further, one end of the light transmissible tube is closed by heat, transparent adhesive tape, or an ultrasonic welder.

In wires coupled by the method of the present invention, since the wire insulating cover is perfectly adhered to the protective sheath formed near the coupled conductors with a strong bonding strength, it is possible to prevent moisture from reaching the coupled conductors, while increasing the mechanical strength of the protective sheath, thus improving the reliability of wire coupling work.

BRIEF DESCRIPTION OF THE DRAWINGS

The features and advantages of the method of the present invention will be more clearly appreciated from the following description taken in conjunction with the accompanying drawings and in which:

FIGS. 1(A) to (E) are perspective views showing the steps of two-wire coupling procedure, for assistance in explaining the method of forming a protective sheath on coupled wire conductors of the present invention;

DETAILED DESCRIPTION OF THE PREFERRED EMBODIMENTS

Figure 2:
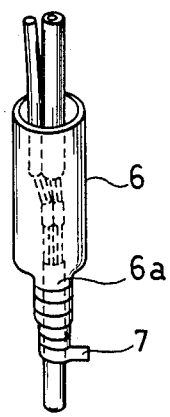
FIG. 2 is a perspective view showing another modification of the method of the present invention.

The feature of a method of forming a protective sheath on coupled wire conductors of the present invention is characterized in that: a tube made of a light transmittable material is fitted to the two coupled wires so as to cover the coupled wire conductors and adjoining insulating covers of the two wires; a photohardening resin is put into a gap formed between the tube and the wires; and the photohardening resin is irradiated from outside the tube with light into hard polymer.

The photohardening resin usable for the method of the present invention includes monomer such as vinyl group or acryl group and polymerization initiator of ultra-violet ray sensitive type. Further, where necessary, known monomer-soluble polymer, filler, plasticizer can be mixed therewith. Further, any photohardening resin can be used as long as physical characteristics required for insulating material such as adhesive strength to wire cover, mechanical strength, electric insulating characteristics, etc. are all satisfied.

Further, the light transmittable resin-molding tube 5 used for the present invention is materials which will not be eroded in contact with the used photochardening resin and can efficiently transmit light having wavelengths effective in hardening the photohardening resin, for instance, such as transparent material of vinyl chloride based resin, polyolefine based resin, etc. The tube can be used as it is as a part of protective sheath after the photohardening resin has been hardened.

To harden the photohardening resin filling the gap between the light transmittable tube and the wire coupled portion, a light source is used which can sufficiently emit light having wavelength effective for promoting resin hardening reaction, for instance, such as ultraviolet rays. However, here light implies radiant rays directly available as initiating energy for resin hardening reaction, without being subjected to the conversion of the radiant energy to heat, not necessarily limited to ultraviolet rays.

To form a photohardening resin sheath around the coupled wire conductors by means of light, the coupled conductors filled with photohardening resin are fed into a hardening chamber in which several light sources (ultraviolet ray lamps) are arranged, and exposed to the light for a time necessary for hardening. By doing this, it is possible to form a resin sheath tightly adhered to the wire conductors and the wire insulating cover.

EXAMPLE 1

An example of the method of the present invention will be described with reference to FIGS. 1(A) to (E).

An insulating cover 1a of a first vinyl chloride covered wire 1 was removed extending about 15 mm at the middle thereof to expose a first conductor 1b. Further, an insulating cover 2a of a second vinyl chloride covered wire 2 was removed by about 10 mm from an end thereof to expose a second conductor 2b. These two conductors 1b and 2b were brought into contact with each other for coupling; a conductor sleeve 3 was fitted and caulked to couple these two conductors 1b and 2b in such a way that the second covered wire 2 branches off from the first covered wire 1 (as shown in FIG. 1(A)).

Subsequently, the covered wire coupled portion is inserted into a heat-shrinkable light transmittable tube 4 (as shown in FIG. 1(B)), an end 4a of the tube 4 from which the covered wire 1 extends was heated for shrinkage so that the tube is brought into tight contact with the outer surface of the insulating cover 1a (in FIG. 1(C)). Thereafter, an opening end 4b of the tube 4 was placed upward and a photohardening resin was put into the tube through an insertion nozzle 5 (FIG. 1(D)). The resin in the tube 4 was hardened by irradiating the tube 4 by an ultraviolet lamp of 2 kW output placed 15 cm away from the tube 4 for 10 to 15 sec. FIG. 1(E) shows a wire coupled portion A covered by a protective sheath B, which was excellent in moisture resistance and mechanical strength.

EXAMPLE 2

Instead of the heat-shrinkable light transmittable tube used in Example 1, a semi-hardened light transmittable tube 6 a diameter of one end of which was reduced was used. The wire coupled portion was inserted into the tube 6, and a transparent adhesive tape 7 was wound around the small-diameter portion 6a to seal the gap between the tube 6 and the wire insulating cover (FIG. 2).

In the same way as in Example 1, a wire coupled portion having a protective sheath was obtained, which was excellent in moisture resistance and mechanical strength.

EXAMPLE 3

Figure 3:
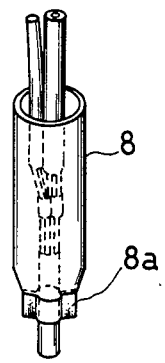
FIG. 3 is a perspective view showing still another modification of the method of the present invention.

Instead of the heat-shrinkable light transmittable tube, a semi-hardened light transmittable tube 8 was used. The wire coupled portion was inserted into the table 8, and one end 8a of the tube 8 was melted and fixed to the outer surface of the insulating cover of the wire by an ultrasonic welder (FIG. 3).

In the same way as in Example 1, a wire coupled portion having a protective sheath was obtained, which was excellent in moisture resistance and mechanical strength.

According to the method of the present invention, since the wire coupled portion is inserted into a light transmittable tube, it is possible to confirm the coupling condition from outside by visual inspection, thus preventing an offset of the protective sheath.

Further, since photohardening resin of high fluidity can be used, adhesive strength between the wire insulating cover and the tube is strong and therefore the sheath is resistant against moisture, thus resulting in excellent insulation characteristics and mechanical strength.

Further, the resin can be hardened at room temperature and under atmospheric pressure, no special light transmittable tube is required, therefore the workability is good and therefore the work can be completed at high efficiently. Further, even if tubes of various sizes are prepared according to the diameter of the wires, the cost is not so high as compared with the cost required when various molding dies are prepared.

What is claimed is:
1. A method of forming a protective sheath on coupled wire conductors of at least two wires each having a conductor and an insulating cover, which comprises the following steps of
   (a) removing the insulating cover from each wire to expose each wire conductor to be coupled;
   (b) coupling at least two exposed conductors to each other;
   (c) fitting a tube made of a light transmittable material to the two coupled wires so as to cover the coupled wire conductors and adjoining insulating covers of the two wires;
   (d) closing one end of the light transmittable tube into contact with at least one insulating cover by winding a transparent adhesive tape around said one end of the light transmittable tube;
   (e) putting a photohardening resin into a gap formed between the tube and the wires; and
   (f) irradiating the photohardening resin from outside the tube with light into hard polymer.
2. A method of forming a protective sheath on coupled wire conductors of at least two wires each having a conductor and an insulating cover, which comprises the following steps of
   (a) removing the insulating cover from each wire to expose each wire conductor to be coupled;
   (b) coupling at least two exposed conductors to each other;

(c) fitting a tube made of a light transmittable material to the two coupled wires so as to cover the coupled wire conductors and adjoining insulating covers of the two wires;
(d) closing one end of the light transmittable tube into contact with at least one insulating cover by melting and fixing said one end of the tube with an ultrasonic welder;
(e) putting a photohardening resin into a gap formed between the tube and the wires; and
(f) irradiating the photohardening resin from outside the tube with light into hard polymer.

* * * * *